Nov. 11, 1941.  W. H. FRANK ET AL  2,261,986
CONTINUOUS OUTLET CONSTRUCTION
Filed Feb. 17, 1940
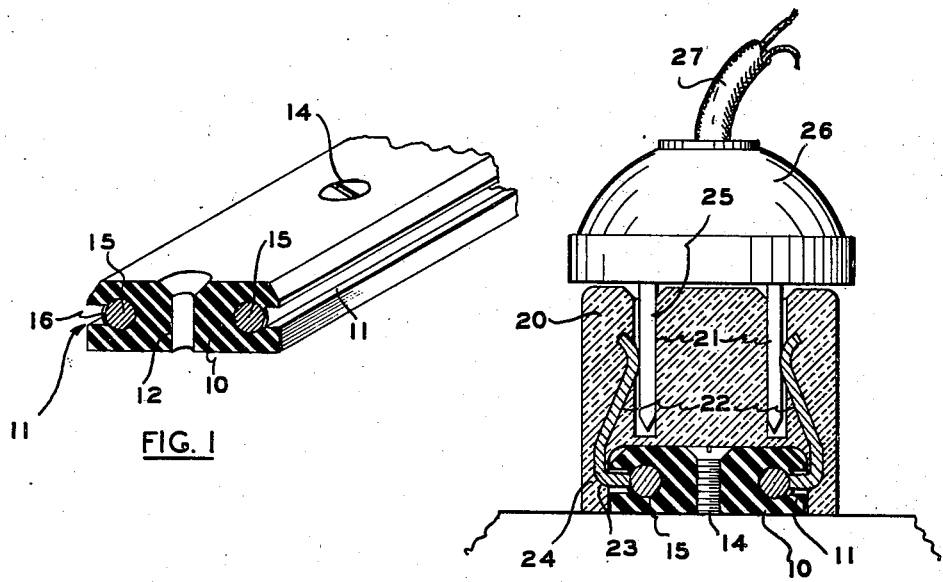
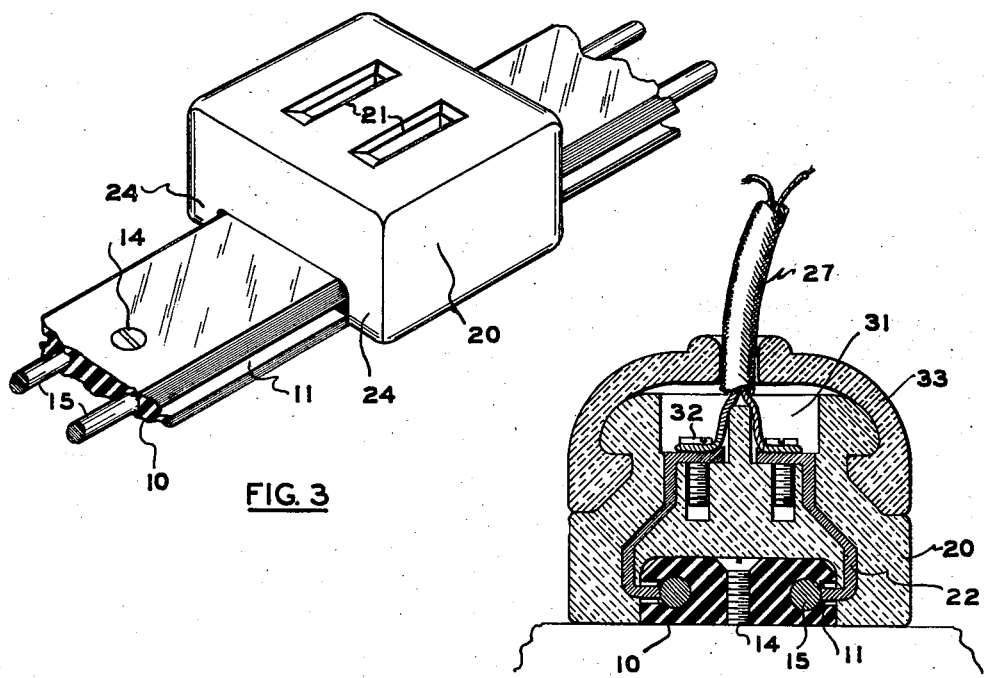
INVENTORS.
William H. Frank
BY Arthur S. Bassette
Daniel H. Guiler ATTORNEY.

Patented Nov. 11, 1941

2,261,986

UNITED STATES PATENT OFFICE 2,261,986

CONTINUOUS OUTLET CONSTRUCTION

William H. Frank and Arthur S. Bassette, Detroit, Mich., assignors to Bulldog Electric Products Company, Detroit, Mich., a corporation of West Virginia Application February 17, 1940, Serial No. 319,408

3 Claims. (Cl. 173—334.1)

This application relates to continuous outlet constructions and more particularly to continuous outlet constructions of the type employing a grooved or slotted strip having conductors or bus bars therein for engagement with portions of connectors or prongs of current take off devices or plugs interlocked and inserted into the strip through the slots or grooves for engagement with the conductors or bus bars.

The strip is formed to be relatively flexible, whereby it may be manufactured in long lengths, coiled and shipped in coils like flexible wire. The strip is adapted to be fastened against a wall, and whenever desired, and wherever desired, current take off devices may be associated with said strip merely by applying the device to a strip in a convenient manner, with the device interlocked to the strip where applied and thus held firmly in applied position.

In the preferred embodiment the strip is so formed that the conductors are not exposed but are continuously covered by insulation and the connector portions which engage the conductors are formed to pierce the insulation and establish electrical contact. For shielding these points of engagement, where the insulation is pierced, the devices are formed with protective flanges which cover and conceal the portions of the strip pierced for contact. The strip, however, is so formed that if a device is removed from a strip, the pierced insulation of the strip conforms itself once more around the conductor to restore the complete insulation covering of the conductors, and for this reason as well as because of the desire for flexibility, the strip might well be made of a material like soft rubber. The flanges, embracing edges of the strip, help retain the devices and the strip in association.

Further objects of the invention will be readily understood upon reference to the embodiment disclosed in the appended drawing.

In this drawing:

Fig. 1 is a section view of a length of strip.

Figs. 2 and 3 show the strip in use with an adapter type of current take off device.

Fig. 4 shows a terminal connector form of current take off device for use with the strip.

Referring to the drawing it will be seen that the strip shown includes a strip or ribbon of insulation 10 having grooves 11 in its narrow edges and holes 12 extending through it for receiving screws or the like 14 for securing the strip against a wall, as shown in Fig. 2. In the grooves 11, which are relatively narrow and deep, and disposed against their bases, are conductor wires or bus bars 15 which may be round as shown, or may be in the form of thin wide ribbon of widths greater than the widths of the narrower slots.

Strip as shown, with the insulation being of soft rubber, may be formed in coils many hundred feet long and shipped in this form and may be applied to walls in an obvious manner to form a conductor strip from which current may be taken whenever and wherever desired.

For concealing the conductors 15, the strip may be formed with thin readily piercable integral portions 16 across the grooves and isolating the conductors from the open sides of the grooves.

For use with the strip here shown, two forms of current take off devices are disclosed and these will now be described.

The adapter form of Figs. 2 and 3 comprises an insulation body 20, preferable of soft rubber having slots 21 containing laterally spaced connectors 22 having inwardly bent portions 23 adapted to enter the grooves 11 and engage the conductors 15 of the strip, portions 23 thus interlocking the device to the strip and holding it against the strip.

Portions 23 may be moved away from each other to enable the device to be applied to strip already mounted on the wall very easily, because the body 20 is of soft rubber. The contracting tendency of the rubber will move portions 23 towards each other to complete the engagement between portions 23 and conductors 15, with portions 23 piercing insulation parts 16 of the strip to establish electrical contact. For covering the portions 23 and the exposed parts of conductors 15 where covers 16 are pierced, there are provided on the body 20 flanges 24 which extend along the strip and are disposed against the narrow edges of the strip, these flanges also serving to aid in holding the device on the strip, particularly where body 20, like strip 10, is of soft rubber, and flanges 24 grip strip 10 with great friction.

The slots 21 are formed to receive prongs 25 of a conventional cap plug 26 having a branch conductor cable 27 leading from it.

The device may be formed as a terminal connector, rather than as an adapter, as in Fig. 4, and will have a large central hole 31 opening to the binding ends of the connectors where there are binding screws 32 for binding the terminals of the branch conductors and a cap 33 secured to the body is provided to complete the device.

Now having described the constructions herein shown, reference may be had to the claims which follow.

We claim:

1. A conductor strip comprising a strip or ribbon of insulation having grooves in its narrow edges and formations for securing it against a wall with one wide face against said wall, and conductor wires or bus bars in and against the bases of said grooves, and thin insulation walls across the grooves isolating the conductors from the open sides of the grooves, in combination with a current take off device comprising an insulation body formed to seat against the exposed wide face of the strip and having lateral extensions or flanges formed to embrace the strip between them by engaging the narrow edges thereof, the extensions projecting no further than the unexposed wide face of the strip, and the body being free of parts covering the unexposed wide face of the strip, the extensions containing laterally spaced connectors having portions adapted to enter said grooves and engage the conductors therein, the connector portions entering the grooves interlocking the device to the strip and holding it against the exposed face thereof, and branch conductors whose terminals are secured to the connectors in said body, the thin walls across the grooves being opened by the strip conductor engaging portions of the connectors, whereby the strip conductors are concealed at all times by either the thin walls or by the body flanges.

2. A conductor strip comprising a strip or ribbon of insulation having grooves in its narrow edges and formations for securing it against a wall with one wide face against said wall, and conductor wires or bus bars in and against the bases of said grooves, and thin insulation walls across the grooves isolating the conductors from the open sides of the grooves, in combination with a current take off device comprising an insulation body formed to seat against the exposed wide face of the strip and having lateral extensions or flanges formed to embrace the strip between them by engaging the narrow edges thereof, the extensions projecting no further than the unexposed wide face of the strip, and the body being free of parts covering the unexposed wide face of the strip, the extensions containing laterally spaced connectors having portions adapted to enter said grooves and engage the conductors therein, the connector portions entering the grooves interlocking the device to the strip and holding it against the exposed face thereof, and branch conductors whose terminals are secured to the connectors in said body, the thin walls across the grooves being opened by the strip conductor engaging portions of the connectors, whereby the strip conductors are concealed at all times by either the thin walls or by the body flanges, the strip having its edges beveled at the surface to be exposed, whereby the conductor engaging portions of the connectors may slide over such edges and into the grooves as the take off device is pushed against the exposed face of the strip when the latter is mounted, the connectors and the device being such that the connectors may separate laterally as the device is moved against the strip.

3. A conductor strip comprising a strip or ribbon of insulation having grooves in its narrow edges and formations for securing it against a wall with one wide face against said wall, and conductor wires or bus bars in and against the bases of said grooves, and thin insulation walls across the grooves isolating the conductors from the open sides of the grooves, in combination with a current take off device comprising an insulation body formed to seat against the exposed wide face of the strip and having lateral extensions or flanges formed to embrace the strip between them by engaging the narrow edges thereof, the extensions projecting no further than the unexposed wide face of the strip, and the body being free of parts covering the unexposed wide face of the strip, the extensions containing laterally spaced connectors having portions adapted to enter said grooves and engage the conductors therein, the connector portions entering the grooves interlocking the device to the strip and holding it against the exposed face thereof, and branch conductors whose terminals are secured to the connectors in said body, the thin walls across the grooves being opened by the strip conductor engaging portions of the connectors, whereby the strip conductors are concealed at all times by either the thin walls or by the body flanges, the strip having its edges beveled at the surface to be exposed, whereby the conductor engaging portions of the connectors may slide over such edges and into the grooves as the take off device is pushed against the exposed face of the strip when the latter is mounted, the connectors and the device being such that the connectors may separate laterally as the device is moved against the strip, the strip being rigid enough, when mounted, so that the beveled edges remain stationary as the device is pushed against the strip.

WILLIAM H. FRANK.
ARTHUR S. BASSETTE.